April 25, 1933.  W. R. McFEELY  1,905,729
REMOVABLE VALVE MECHANISM FOR UNDERGROUND LIQUID TANKS
Filed April 11, 1932
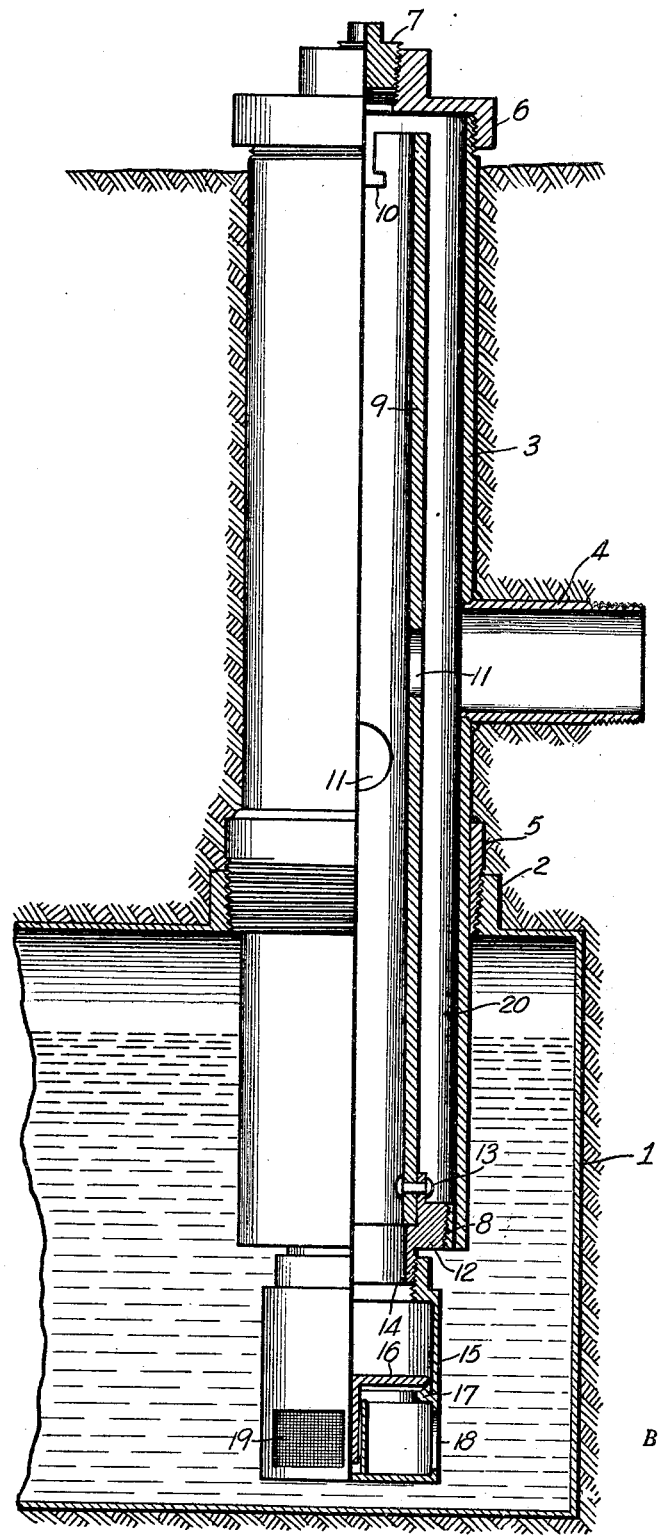
INVENTOR.
William R. McFeely
BY Thos. E. Scofield
ATTORNEY Patented Apr. 25, 1933

1,905,729

UNITED STATES PATENT OFFICE

WILLIAM R. McFEELY, OF PONCA CITY, OKLAHOMA

REMOVABLE VALVE MECHANISM FOR UNDERGROUND LIQUID TANKS

Application filed April 11, 1932. Serial No. 604,465.

My invention relates to an underground liquid storage tank and more particularly to a removable foot valve assembly in combination therewith.

This invention is an improvement over the invention of Joseph M. McGinnis appearing in United States Letters Patent 1,520,362, dated December 23, 1924.

One object of my invention is to provide a foot valve assembly for underground liquid tanks which will enable the ready removal of the foot valve from the surface of the ground for purposes of inspection, repair and replacement of the foot check valve in the suction line.

Another object of my invention is to provide a construction which will preclude the loss of suction in the discharge line of the tank.

A further object of my invention is to provide a settling space from which suction is taken to permit dirt, grit or other foreign matter to gravitate.

The figure is an elevation partly in section of a structure embodying one mode of carrying out my invention.

Referring now to the drawing, the underground tank 1 is provided with a flange 2 in which the casing 3 is secured in any suitable manner in liquid tight relation. It is to be noted that the casing 3 is integral, the suction line connection 4 and the bushing 5 being welded thereto. In this manner, I am able to avoid joints or tight fittings in the casing. The casing has a closure member 6 which is provided with a vent plug 7 which will permit the venting of air during the initial filling of the casing and the suction pipe with liquid. Brazed to the inside of the lower portion of the casing 3 is a threaded bushing 8 into which the foot valve assembly is screwed. An inside suction pipe 9 is provided at its upper end with slots or T-shaped openings 10 adapted to receive a wrench for the rotation of the pipe 9. Openings 11 are provided in suction pipe 9 for the discharge of fluid from the tank. The lower portion of the suction pipe 9 carries a threaded member 12 which is riveted to the suction pipe 9 by rivets 13 or in any other suitable manner. The threaded member 12 is adapted to be screwed into the threaded bushing 8 which is brazed to the casing 3. The member 12 has a reduced extension 14 which carries the housing 15 in which the foot check valve 16 is seated on seat 17. The housing is provided with suction inlet openings 18 provided with suitable screens 19.

In operation, the suction line which is screwed on to nipple 4 takes suction from the annular space 20 formed by suction pipe 9 and casing 3. It will be noted that the annular space 20 acts as a reservoir to supply liquid to the suction line and also forms a sediment space for the settling of grit, dirt or other foreign matter preventing its withdrawal through the suction line. Fluid in storage tank 1 enters through openings 18 in the housing 15, passes by check valve 16 upwardly through suction pipe 9, through openings 11 and fills the settling space 20, from which the fluid passes upwardly through nipple 4, through the suction line to the surface. When it is desired to remove the foot valve 16 for purposes of inspection, repair or replacement, all that is necessary is to remove cover plate 6, insert an appropriate tool in slots 10 and unscrew the assembly which consists of suction pipe 9, fitting 12 which carries housing 15 and the valve assembly. It will be obvious that the entire assembly can be removed from the surface of the ground expeditiously and in a short space of time.

Due to the fact that the suction is taken from a reservoir, loss of suction due to a leaky foot valve will be precluded. This is one advantage of my improvement over the McGinnis structure above referred to. The reservoir or settling space 20 also acts as a sediment tank permitting dirty water and other foreign matter to gravitate out of the liquid being withdrawn.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An underground tank fluid discharge assembly comprising in combination a tank, a casing secured thereto, a foot valve unit including a suction pipe, a valve housing and a valve; said unit being removably supported in said casing, means integral with said casing for supporting said unit, said section pipe being provided with a discharge opening intermediate its length and being spaced inwardly from said casing to form an annular reservoir therewith, a discharge nipple for said casing communicating with said reservoir, and a cover plate for said casing accessible at the surface of the ground adapted to be removed to permit said unit to be withdrawn.

2. An assembly according to claim 1 wherein said discharge nipple is integral with said casing.

3. An assembly according to claim 1 wherein said cover plate is provided with a vent plug.

4. An assembly according to claim 1 wherein said suction pipe is provided with sockets for the reception of a unit removing tool.

5. An assembly according to claim 1 wherein the upper end of said suction pipe extends in proximity to said cover plate.

In testimony whereof I affix my signature.

WILLIAM R. McFEELY.